United States Patent
Farnsworth et al.

(10) Patent No.: US 10,862,143 B2
(45) Date of Patent: Dec. 8, 2020

(54) TURBO COMPRESSOR PATH AND RATE CONTROL

(71) Applicants: Toyota Motor Engineering & Manufacturing North America, Inc., Plano, TX (US); Toyota Jidosha Kabushiki Kaisha, Toyota (JP)

(72) Inventors: Jared M. Farnsworth, Roseville, CA (US); Daniel Folick, Long Beach, CA (US); Shigeki Hasegawa, Aichi (JP); Naoki Tomi, Aichi (JP)

(73) Assignees: TOYOTA JIDOSHA KABUSHIKI KAISHA; TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 53 days.

(21) Appl. No.: 16/262,792

(22) Filed: Jan. 30, 2019

(65) Prior Publication Data
US 2020/0243880 A1    Jul. 30, 2020

(51) Int. Cl.
*H01M 8/04111* (2016.01)
*H01M 8/04746* (2016.01)
*H01M 8/0438* (2016.01)

(52) U.S. Cl.
CPC .... *H01M 8/04111* (2013.01); *H01M 8/04395* (2013.01); *H01M 8/04753* (2013.01); *H01M 2250/20* (2013.01)

(58) Field of Classification Search
None
See application file for complete search history.

(56) References Cited

U.S. PATENT DOCUMENTS

| | | |
|---|---|---|
| 6,349,535 B1 | 2/2002 | Berg et al. |
| 6,616,424 B2 | 9/2003 | Raiser |
| 7,470,479 B2 | 12/2008 | Kobayashi et al. |
| 7,640,744 B2 | 1/2010 | Rollinger et al. |
| 8,157,035 B2 | 4/2012 | Whitney et al. |
| 9,034,529 B2 | 5/2015 | Mueller et al. |
| 9,926,872 B2 | 3/2018 | Makled et al. |
| 2004/0151964 A1 | 8/2004 | Finger et al. |
| 2010/0314186 A1 | 12/2010 | Ma |

(Continued)

FOREIGN PATENT DOCUMENTS

| | | |
|---|---|---|
| EP | 1830110 | 12/2013 |
| GB | 2528506 | 1/2016 |
| JP | 6323156 | 11/1994 |

*Primary Examiner* — Scott J. Chmielecki
(74) *Attorney, Agent, or Firm* — Snell & Wilmer LLP (57) ABSTRACT

Methods, systems, and devices of a control system. The control system includes a fuel cell stack. The control system includes a compressor that is configured to control and provide a total air flow within the vehicle. The compressor has an air pressure ratio and an air flow rate and operates at a speed. The control system includes an electronic control unit coupled to the fuel cell stack and the compressor. The electronic control unit is configured to determine a path associated with one or more adjustments to the air pressure ratio or the air flow rate. The electronic control unit is configured to determine a rate associated with the one or more adjustments based on the path and control at least one of the air pressure ratio, the speed or the air flow rate to operate the compressor based on the path and the rate.

20 Claims, 8 Drawing Sheets

(56) References Cited

U.S. PATENT DOCUMENTS

| | | | |
|---|---|---|---|
| 2011/0143241 A1* | 6/2011 | Tighe | H01M 8/04303 |
| | | | 429/428 |
| 2015/0030953 A1* | 1/2015 | Asai | H01M 8/04089 |
| | | | 429/446 |
| 2016/0190611 A1 | 6/2016 | Grundei et al. | |
| 2016/0211536 A1* | 7/2016 | Kwon | H01M 8/04104 |
| 2017/0044971 A1 | 2/2017 | Racca | |
| 2017/0197612 A1 | 7/2017 | Rostocki et al. | |
| 2019/0181467 A1* | 6/2019 | Farnsworth | F28F 27/00 |

* cited by examiner

TURBO COMPRESSOR PATH AND RATE CONTROL

BACKGROUND

1. Field

The present disclosure relates to systems and methods for controlling pressure and flow within a turbo compressor.

2. Description of the Related Art

Vehicles, such as electric vehicles (EV), have a fuel cell stack and other components that operate within specific operational parameters, such as pressure and flow rate, so that the vehicle operates at a particular speed. Conventional vehicles, such as a vehicle with an internal combustion engine, have a conventional turbo compressor that operates within certain particular parameters, such as a response time of approximately 1.5 seconds from no flow to full flow. Whereas, EVs have an electric turbo compressor that operates faster with a response time of approximately 0.5 seconds from no flow to full flow.

Moreover, conventional turbo compressors operate within a narrow range inside a normal operation region that is outside a surge region and a stall region. Electric turbo compressors, however, may operate within a wide range inside the normal operation region and closer to the surge boundary. A turbo compressor operates within hardware limitations and at optimal efficiency when within the normal operation region. When the turbo compressor operates within the surge region or the stall region, the turbo compressor operates outside the normal operation region and damage and/or instability may occur. When operating within the normal operation region, the vehicle operates at peak efficiency and the components of the vehicle operate within hardware limitations so as not to damage the components and/or operate inefficiently when generating electrical energy.

Accordingly, there is a need for a system, apparatus and/or method to control the pressure and air flow within the turbo compressor to operate the turbo compressor within the normal operation region to meet or exceed the higher operational and/or performance parameters.

SUMMARY

In general, one aspect of the subject matter described in this specification is embodied in a control system. The control system controls air flow within a vehicle. The control system includes a fuel cell stack. The fuel cell stack is configured to generate electrical energy. The control system includes a compressor that is configured to control and provide a total air flow within the vehicle. The compressor has an air pressure ratio and an air flow rate and operates at a speed. The control system includes an electronic control unit coupled to the fuel cell stack and the compressor. The electronic control unit is configured to determine a path associated with one or more adjustments to the air pressure ratio or the air flow rate. The electronic control unit is configured to determine a rate associated with the one or more adjustments based on the path and control at least one of the air pressure ratio, the speed or the air flow rate to operate the compressor within a normal operation region based on the path and the rate.

These and other embodiments may optionally include one or more of the following features. The control system may include a bypass path and a bypass valve. The bypass path directs air flow toward an exhaust and away from the fuel cell stack. The bypass valve is configured to split the total air flow into a first portion and a second portion. The first portion of the total air flow is directed into the fuel cell stack and the second portion is directed toward the bypass path. The compressor may provide the total air flow that is sent to the fuel cell stack or the bypass path via the bypass valve.

The control system may include a back pressure valve. The back pressure valve may be configured to create pressure back to the compressor and fuel cell stack. The electronic control unit may be configured to control one or more positions of the back pressure valve or the bypass valve or the speed of the compressor to adjust the air pressure ratio or the air flow rate. The electronic control unit may be configured to determine a sensitivity. The sensitivity may indicate a change in the pressure ratio relative to a change in the air flow rate at a constant speed, or vice versa. The electronic control unit may determine the path and the rate based on the sensitivity. The electronic control unit may optimize the path and the rate to minimize a response time and control the at least one of the air pressure ratio, the speed or the air flow rate further based on the optimized path and the optimized rate.

In another aspect, the subject matter is embodied in a method for controlling air flow within a vehicle. The method includes determining an air flow rate and a pressure ratio. The method includes a sensitive region, a non-sensitive region and a sensitive boundary line. The sensitive boundary line represents a boundary of the sensitive region and the non-sensitive region. The method includes determining a target air flow rate and a target pressure ratio. The method includes determining a path between the air flow rate and the pressure ratio to the target air flow rate and the target pressure ratio. The method includes determining a target rate of pressure ratio and airflow change based on the path. The method includes controlling one or more actuators to adjust the air flow rate and the pressure ratio based on the rate and the path.

In another aspect, the subject matter is embodied in a control system for controlling air flow within a vehicle. The control system includes a fuel cell stack that is configured to generate electrical energy. The control system includes a compressor configured to control and provide a total air flow within the vehicle and having an air pressure ratio and an air flow rate. The control system includes a bypass valve that is configured to split the total air flow between a bypass path and the fuel cell stack. The control system includes an electronic control unit connected to the fuel cell stack and the compressor. The electronic control unit is configured to determine a path associated with one or more adjustments to the air pressure ratio or the air flow rate. The electronic control unit is configured to determine a target rate of pressure ratio and airflow change associated with the one or more adjustments. The electronic control unit is configured to control the compressor or the bypass valve to adjust at least one of the air pressure ratio, a speed or the air flow rate to operate the compressor within a normal operation region based on the path and the rate.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views.

DETAILED DESCRIPTION

Disclosed herein are systems, apparatuses and methods for controlling air flow within a vehicle. The control system operates one or more actuators including a compressor (ACP), a bypass valve (APV) or a back pressure valve (AVB) to control the air flow within the vehicle. In electric, hybrids, fuel cell and other vehicles that do not entirely rely on an internal combustion engine, the turbo compressor may need to go from no flow to full flow in a faster amount of time to meet performance targets and other necessary operating conditions, and so, an electrically driven turbo compressor is used. Traditional turbo compressor controls are inadequate to meet the response and operational location requirements necessary. And as such, the control system implements improved rate and path control to meet the response and operational location requirements. This reduces the response time to go from no flow to full flow within the turbo compressor.

Other benefits and advantages include the capability to control one or more operating parameters including the air flow rate ("flow rate"), the speed and/or the air pressure ratio ("pressure ratio") within the compressor to maintain the compressor within a normal operation region and to maintain a corresponding pressure ratio within the fuel cell stack. Since the fuel cell stack operates at various pressure ratios and flow rates, the compressor must be able to vary and operate within the entire normal operation region and not just within a fixed region of the normal operation region. Thus, the control system couples the one or more operating parameters when adjusting or controlling the operating parameters, which ensures that the compressor continues to operate within the normal operation region, even when the operating state is near the surge boundary. This ensures that the compressor operates within hardware limitations, while the operating state is near the surge boundary, which is necessary for the fuel cell stack to operate efficiently.

Figure 1:
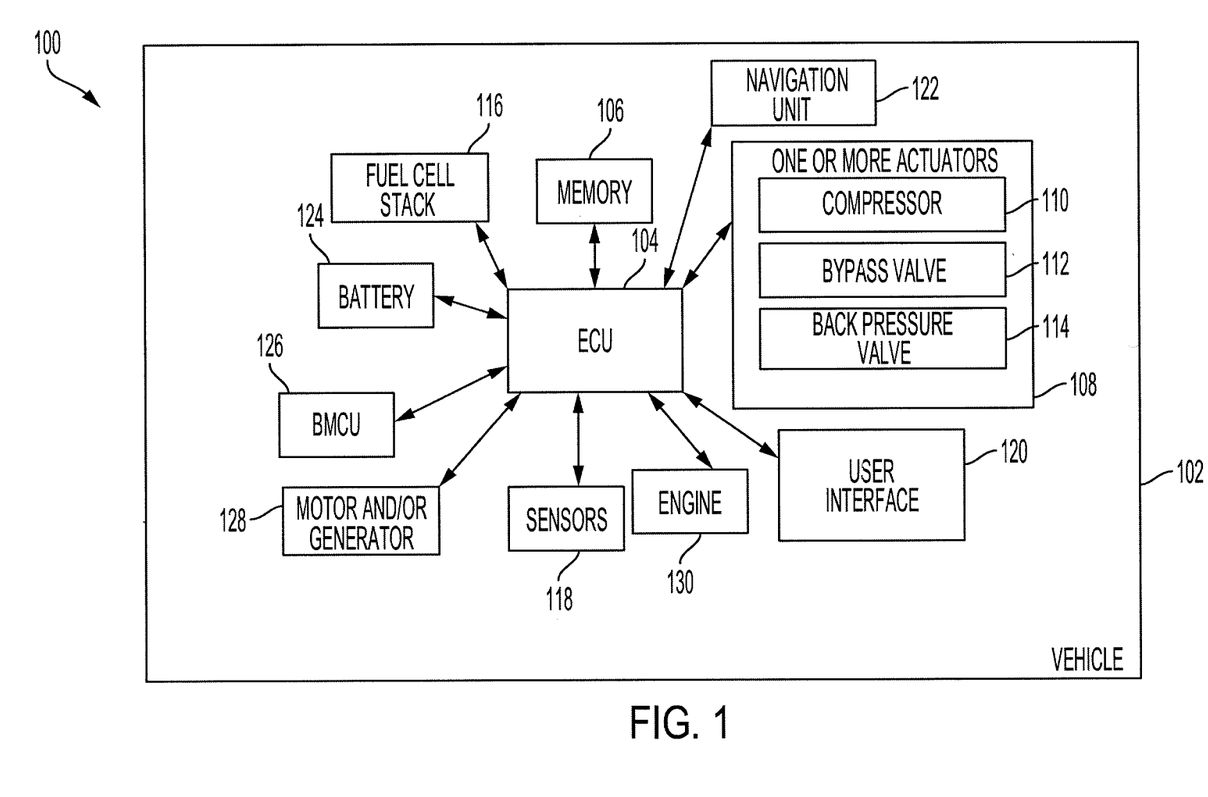
FIG. 1 is a block diagram of an example air control system ("control system") that controls the air flow into the fuel cell stack of a vehicle according to an aspect of the invention.

FIG. 1 shows an air control system ("control system") 100 that controls the flow of air into and out of the fuel cell stack 116. The control system 100 controls various parameters, such as the speed, air pressure and/or the flow rate so that the compressor 110 operates within a normal operation region and has a response time that meets other operational requirements to operate the fuel cell stack 116. The control system 100 includes a processor, such as an electronic control unit (ECU) 104, a memory 106, a fuel cell stack 116, one or more sensors 118 and one or more actuators 108. The control system 100 may include one or more other components, such as a user interface 120, a navigation unit 122, a battery 124, a battery management control unit (BMCU) 126, a motor and/or generator 128 and/or an engine 130.

The control system 100 includes one or more processors, such as an electronic control unit (ECU) 104. The ECU 104 may be implemented as a single ECU or as multiple ECUs. The ECU 104 may be electrically coupled to some or all of the components of the vehicle 102, such as the motor and/or generator 128, one or more sensors 118 and/or one or more actuators 108. The ECU 104 may include one or more processors or controllers specifically designed for controlling the one or more actuators 108 and/or obtaining data from the one or more sensors 118 to control or adjust the one or more actuators 108 to meet various targets, e.g., speed, pressure ratio, and/or flow rate out of the compressor 110, into a bypass path and/or into the fuel cell stack 116. The ECU 104 may be coupled to a memory 106 and execute instructions that are stored on the memory 106.

The memory 106 may be coupled to the ECU 104 and store instructions that the ECU 104 executes. The memory 106 may include one or more of a Random Access Memory (RAM) or other volatile or non-volatile memory. The memory 106 may be a non-transitory memory or a data storage device, such as a hard disk drive, a solid-state disk drive, a hybrid disk drive, or other appropriate data storage, and may further store machine-readable instructions, which may be loaded and executed by the ECU 104.

The control system 100 may include a user interface 120. The control system 100 may display one or more notifications on the user interface 120 that indicate initialization of the control system 100 or an adjustment by the control system 100 when managing and/or controlling the one or more actuators 108 to control the pressure and/or flow rate of air into the fuel cell stack 116 and/or within the compressor 110. The control system 100 may display the actual or estimated pressure and/or flow rate of the air flowing through the compressor 110 and/or into the fuel cell stack 116.

The control system 100 may include one or more sensors 118 that measure or determine real-time values of the speed of the compressor 110, the positions of the bypass valve 112 and/or back pressure valve 114, and/or the pressure and/or flow rate within the fuel cell stack 116 and/or the compressor 110. For example, the one or more sensors may include one or more pressure sensors that measure the air pressure in the fuel cell stack 116 and/or the air pressure within the compressor 110. In another example, the one or more sensors 118 may include a speed sensor that measures the speed of the compressor 110 and/or a flow sensor that measures a flow rate within the compressor 110 and/or into the fuel cell stack 116.

The control system 100 includes a fuel cell stack 116. The fuel cell stack 116 has fuel cells. The fuel cells convert chemical energy from a fuel, such as hydrogen gas, into electricity through an electrochemical reaction of hydrogen gas with oxygen or another oxidizing agent. The fuel cells require a continuous source of fuel and oxygen to sustain the chemical reaction to produce electricity continuously for as long as fuel and oxygen are supplied. The control system 100 has a bypass branch or path ("bypass path") 206. The bypass path 206 allows the air to bypass the fuel cell stack 116.

Figure 5:
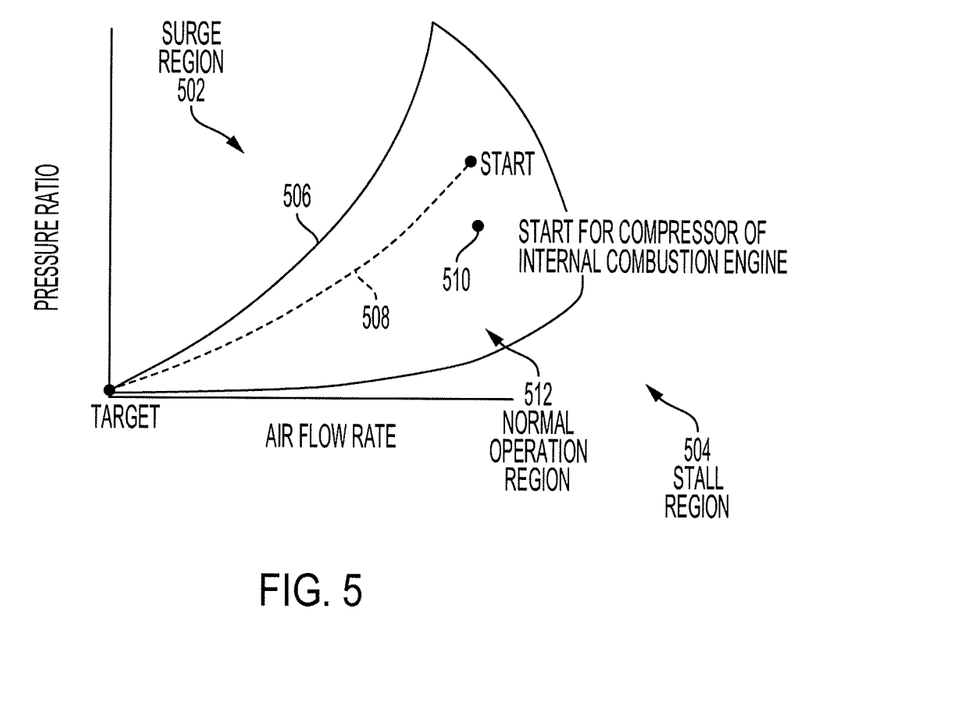
FIG. 5 shows the different operating regions of the compressor of the control system of FIG. 1 according to an aspect of the invention.

The control system 100 includes one or more actuators 108. The one or more actuators 108 include a compressor 110, a bypass valve 112 and/or a back pressure valve 114. The one or more actuators 108 are positioned, moved or otherwise adjusted to adjust or control the pressure ratio and/or the flow rate within the compressor 110 and the fuel cell stack 116. The control system 100 may control the speed of the compressor 110 and/or the position of the bypass valve 112 and/or back pressure valve 114. The ECU 104 may cause the one or more actuators 108, e.g., by sending a signal, to adjust the pressure ratio and/or the flow rate within the compressor 110 to operate the compressor 110 within a normal operating region. The normal operating region 512 is a region of operation where the compressor 110 operates within hardware limitations and outside the surge region 502 and stall region 504, as shown in FIG. 5, for example. A surge boundary 506 delineates the boundary between the normal operation region 512 and the surge region 502. If the compressor 110 enters the surge region 502, flow reversal may occur, which may cause damage to the compressor 110.

FIG. 5 shows the different operating regions of the compressor 110. When the compressor 110 operates at the top-right of the normal operation region 512, the compressor 110 may operate at the maximum speed, whereas, when the compressor 110 operates at the bottom-left near or within the stall region 504, the compressor 110 has stalled.

The compressor 110 may be an electrically driven turbo compressor, which may have a higher performance target and may require a faster response time than a traditional turbo compressor for an internal combustion engine. Thus, the turbo compressor may operate near the surge boundary 506 along the path or region 508, as shown in FIG. 5, to meet the response and operating performance requirements.

Traditional compressors operate more within, such as in the middle of, the normal operation region 512, such as near the starting point 510 for a compressor of an internal combustion engine, whereas, the turbo compressor that works in combination with a fuel cell stack 116 may need to operate near the surge boundary 506 and at various combinations of pressure ratios and flow rates. Near the surge boundary 506, operation of the compressor 110 may be sensitive, i.e., a small change in pressure ratio may result in a significant change in flow rate when the speed of the compressor 110 is constant.

The compressor 110 pressurizes air by drawing in air and outputting pressurized air and creates a total air flow that is directed toward the fuel cell stack 116 and the bypass path 206. The compressor 110 provides air flow at a certain pressure to the fuel cell stack 116 so that the air within the compressor 110 has the same pressure ratio as the pressure ratio of the air that flows into the fuel cell stack 116. The compressor 110 may have a body through which air may be drawn and an impeller, which may include one or more airfoils, and may be located inside the body. A motor may generate mechanical power having torque to rotate the impeller to pressurize the air. The compressor 110 provides the pressurized air and/or the total flow of the air to the bypass valve 112, which has an adjustable valve position that allows a portion of the air flow through to the bypass path 206 and another portion of the air flow through to the fuel cell stack 116.

The ECU 104 controls a position of the bypass valve 112, which splits air from the compressor 110. The bypass valve 112 splits the air flow into the fuel cell stack 116 and/or into a bypass path 206, which allows the compressor 110 to provide air flow at an increased flow rate beyond the fuel cell demand, and at a particular pressure ratio. The bypass valve 112 adjusts the flow rate so the air going into the fuel cell stack 116 has the correct flowrate, while the compressor 110 remains operating within the normal operation region. For example, if the fuel cell stack 116 operates at 1000 l/min and a pressure ratio of 3, the pressure ratio and flow rate combination would cause the compressor 110 to operate within the surge region. The compressor 110, instead, may operate at a pressure ratio of 3 with a flow rate of 4000 l/min by increasing the speed of the compressor, and the bypass valve 112 may open to split the flow rate so that 1000 l/min is directed to the fuel cell stack 116 and 3000 l/min is directed toward the bypass path 206. Thus, the compressor 110 may operate at the pressure ratio of 3 with a flow rate of 4000 l/min within the normal operation region.

The bypass valve 112 may be in an open, partially opened or a closed position. When the bypass valve 112 is completely open, the bypass valve 112 allows the air to flow entirely through to the bypass path where the air is exhausted. When the bypass valve 112 is partially open, a portion of the air is directed to the fuel cell stack 116 and another portion of the air flows through to the bypass path. This reduces the flow rate or amount of air into the fuel cell stack 116 and within the compressor 110. When the bypass valve 112 is completely closed, all the air is directed to or flows through the fuel cell stack 116.

The back pressure valve 114 may similarly have an adjustable valve position and may be opened, partially opened or closed. The ECU 104 may control the position of the back pressure valve 114 to adjust a pressure of the air within the fuel cell stack 116. For example, the pressure within the fuel cell stack 116 may be increased or decreased by closing or opening the back pressure valve 114, respectively.

The control system 100 may include a user interface 120. The user interface 120 may be a vehicle display or a personal device, e.g., a mobile phone, a tablet, a personal computer, which is connected to the ECU 104 through a network access device (not shown) of the vehicle 102 across a network. The user interface 120 may include any device capable of receiving user input, such as a user interface element, a button, a dial, a microphone, or a touch screen, and any device capable of output, such as a display, a speaker, or a refreshable braille display. The user interface 120 allows a driver or a passenger of the vehicle 102 to communicate with the ECU 104. For example, the driver may be able to provide data to the ECU 104 and/or receive feedback from the ECU 104 via the user interface 120.

The control system 100 may be connected to, retrofitted in and/or included in a vehicle 102. A vehicle 102 is a conveyance capable of transporting a person, an object, or a permanently or temporarily affixed apparatus. The vehicle 102 may be a self-propelled wheeled conveyance, such as a car, sports utility vehicle, truck, bus, van or other motor or battery driven or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack 116, a motor and/or a generator 128. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors 118 and/or a navigation unit 122 to drive autonomously.

The vehicle 102 may include a motor and/or generator 128. The motor and/or generator 128 may be an electric motor and an electric generator that converts electrical energy into mechanical power, such as torque, and converts mechanical power into electrical energy. The motor and/or generator 128 may be coupled to the battery 124. The motor and/or generator 128 may convert the energy from the battery 124 into mechanical power, and may provide energy back to the battery 124, for example, via regenerative braking. In some implementations, the vehicle 102 may include one or more additional power generation devices such as the engine 130 or a fuel cell stack 116. The engine 130 combusts fuel to provide power instead of and/or in addition to the power supplied by the motor and/or generator 128.

The battery 124 may be coupled to the motor and/or generator 128 and may provide electrical energy to and receive electrical energy from the motor and/or generator 128. The battery 124 may include one or more rechargeable batteries.

The battery management and control unit (BMCU) 126 may be coupled to the battery 124 and control and manage the charging and discharging of the battery 124. The BMCU 126, for example, may measure, using battery sensors (not shown), parameters used to determine the state of charge (SOC) of the battery 124.

The vehicle 102 may include a navigation unit 122 that obtains navigational map information and/or vehicle information to autonomously navigate the vehicle 102 and/or display a route to the user through the user interface 120. The navigational map information may include a map that identifies roadways, terrains and other points of interest to navigate the vehicle 102. The navigational map information may include route information that includes a starting point, a destination point and a path of travel from the starting point to the destination point for the vehicle 102. The vehicle information may include a current location of the vehicle 102, a current direction of travel of the vehicle 102 and/or a current speed of the vehicle 102.

Figure 2:
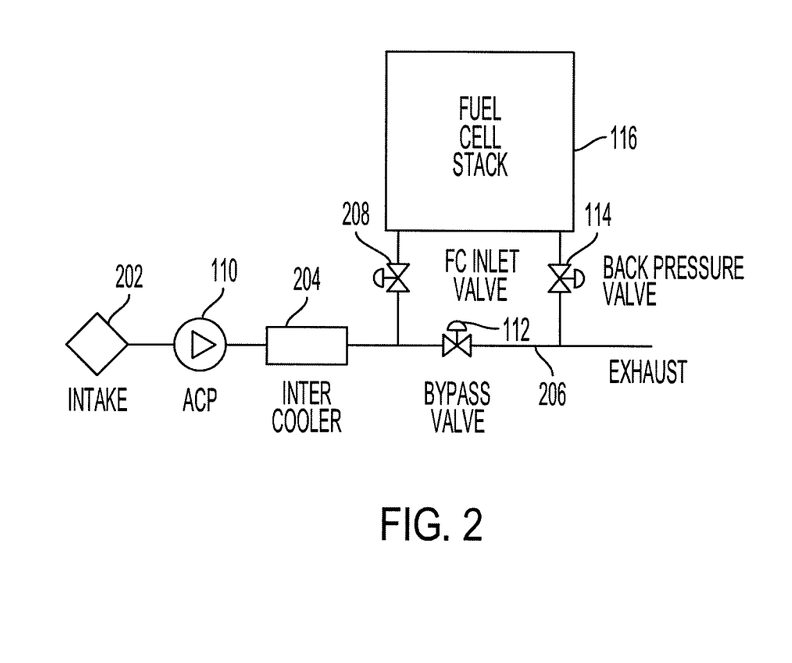
FIG. 2 is a schematic diagram of the interconnection among the one or more components of the control system of FIG. 1 according to an aspect of the invention.

FIG. 2 is a block diagram showing various components of the control system of FIG. 1. FIG. 2 shows additional details of the control system of FIG. 1. In particular, the control system 100 may include an air intake 202, a compressor 110, an intercooler 204, a fuel cell inlet valve 208, a fuel cell stack 116, a back pressure valve 114, and a bypass valve 112 positioned along the bypass path 206.

The control system may include the air intake 202. The air intake 202 may receive air from an ambient environment, such as outside of the vehicle 102 of FIG. 1. The compressor 110 may receive air from the air intake 202 and pressurize the air. The compressor 110 may provide the pressurized air to the intercooler 204. In some implementations, the air intake 202 may include a filter for filtering debris from the received air. The control system 100 may include the intercooler 204. The intercooler 204 may receive the air from the compressor 110 and may receive a heat exchange medium, such as a coolant. The intercooler 204 may change a temperature of the air flowing through the control system 100.

The bypass valve 112 may split the air from the intercooler 204 into the fuel cell stack 116 and the bypass path 206. The bypass valve 112 may have an adjustable valve position that controls the amount of air that flows into the fuel cell stack 116 and/or through the bypass path 206, as discussed above. By opening or partially opening the bypass valve 112, the control system 100 allows the fuel cell stack 116 to operate at a pressure ratio that would normally cause the compressor 110 to operate within the surge region, but since the bypass valve 112 allows a portion of the air flow to be diverted through the bypass path 206 and exhausted, the compressor 110 operates at a higher flow rate and within the normal operation region. The air that flows into the fuel cell stack 116 may pass through a fuel cell inlet valve 208. The fuel cell inlet valve 208 may control air flow into the fuel cell stack 116.

The control system 100 includes a back pressure valve 114. The back pressure valve 114 may have an adjustable valve position that may be controlled to adjust a pressure of the air within the fuel cell stack 116. For example, the pressure within the fuel cell stack 116 may be increased by closing the back pressure valve 114 and may be decreased by opening the back pressure valve 114. The ECU 104 may control the one or more actuators 108 including the compressor 110, the bypass valve 112 and/or the back pressure valve 114.

Figure 3:
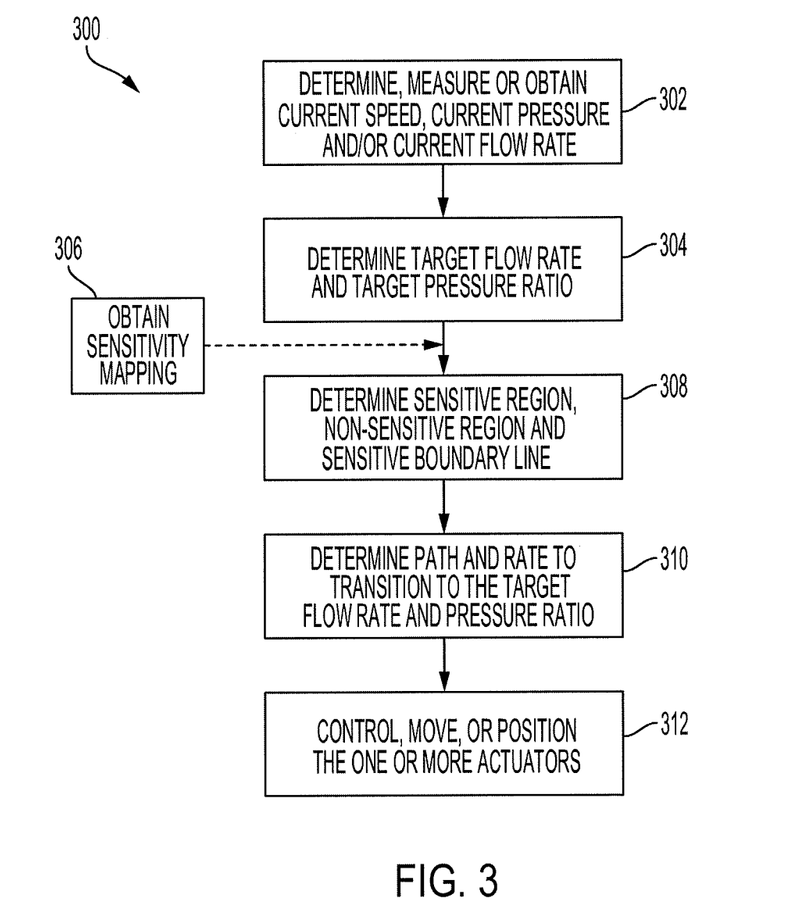
FIG. 3 is a flow diagram of an example process for controlling one or more actuators of the control system of FIG. 1 according to an aspect of the invention.

FIG. 3 is a flow diagram of a process 300 for controlling the one or more actuators 108. The control system 100 uses the one or more actuators 108 to adjust the pressure ratio and/or the flow rate within the compressor 110 and into the fuel cell stack 116. One or more computers or one or more data processing apparatuses, for example, the one or more processors, such as the ECU 104, may implement the process 300.

The control system 100 determines, measures or obtains the current speed, current flow rate and the current pressure within the compressor 110 (302). The control system 100 associates the current flow rate and the current pressure with a starting value of a current state of the flow rate and pressure ratio within the compressor 110 and/or the fuel cell stack 116. The speed, pressure ratio and flow rate are highly coupled and overshoot or undershoot may occur if the speed, pressure ratio and air flow are not dynamically adjusted in response to each of the other factors in real-time.

The control system 100 may use a pressure sensor to measure, detect or otherwise obtain the current pressure of the air within the compressor 110. The control system 100 may determine or calculate a current pressure ratio based on the current pressure. The control system 100 may use a flow sensor to measure, detect or otherwise obtain the flow rate and a speed sensor to measure, detect or otherwise obtain the current speed of the motor of the compressor 110. The speed of the motor of the compressor 110 may be a rotational speed of the impeller of the compressor 110.

The control system 100 determines a target flow rate and a target pressure ratio (304). The target flow rate and the target pressure ratio correspond to a final value for a final state for the flow rate and pressure ratio within the compressor 110 and the fuel cell stack 116. The final values may be based on a power request of the fuel cell stack 116, which may correspond to driver input such as depression of an accelerator pedal or correspond to control by the ECU 104 in an autonomous or semi-autonomous vehicle.

The control system 100 may obtain a sensitivity mapping and/or database ("sensitivity mapping") that shows the various combinations of flow rates and/or pressure ratios and the sensitivity that is associated with the region of the flow rate and/or pressure ratio combinations or pairs (306). The sensitivity mapping may be pre-determined or modeled by the control system 100 or may be received from a remote device and stored in the memory 106.

The control system 100 determines a sensitive region, a non-sensitive region and a sensitive boundary line (308). The control system 100 determines a sensitivity for various flow rate and/or pressure ratio combinations or pairs. The sensitivity for the various flow rates and/or pressure ratios may be stored in a sensitivity mapping. The control system 100 may determine the sensitivity either in real-time or pre-determine the sensitivity and store the sensitivity in the sensitivity mapping. The sensitivity refers to an amount of change in the flow rate relative to an amount of change in the pressure ratio over one or more time steps when the air compressor speed is constant. A time step refers to a measure of time between calculations or measurements performed by the processor, such as the ECU 104. The time step may be approximately 16 ms, for example. The sensitivity mapping stores the sensitivity at the various flow rates and/or pressure ratios. The control system 100 uses the sensitivity mapping to determine the sensitivity at a particular flow rate and/or pressure ratio and the different sensitivities surrounding the particular flow rate and/or pressure ratio. The sensitivity mapping may also indicate the change in sensitivity from one flow rate and/or pressure ratio to another flow rate and/or pressure ratio. The sensitivity mapping associates different regions, e.g., different combinations of flow rate and pressure ratio, with different sensitivities.

The amount of sensitivity of a position of a flow rate and pressure ratio combination or pair is affected by the distance the position of the flow rate and the pressure ratio pair to the surge line boundary. As the position of the flow rate and pressure ratio pair is closer to the surge line boundary, the amount of sensitivity increases. That is, a small change in pressure ratio results in a large change in flow rate. Thus, the sensitive region has a lower tolerance for change in pressure ratio than the non-sensitive region, which has a higher tolerance. This sensitivity effectively quantifies a tolerable amount of error in changing one state with respect to the other.

The region closer to the surge line boundary has a smaller error tolerance before crossing over the surge line boundary into the surge region and is more sensitive to changes in pressure ratio at constant speeds, and so, the control system 100 needs to be more careful and make smaller changes to the pressure ratio to prevent the pressure ratio and flow rate pair within the compressor 110 from exceeding the surge line boundary into the surge region. Similarly, the region farther from the surge line boundary has a larger error tolerance, and so, the control system 100 may make larger changes of the pressure ratio and/or flow rate without concern for exceeding the surge line boundary.

The non-sensitive region is a region of different flow rate and pressure ratio combinations where a change in the flow rate and/or a change in the pressure ratio do not cause a significant change in the other factor, respectively. The amount of the change that may be considered significant or non-significant may be represented by the sensitive boundary line between the non-sensitive region and the sensitive region. The sensitive boundary line represents the combination of pressure ratios and flow rates that border the two regions and correspond to a threshold change that is pre-configured or otherwise determined. The sensitive region is a region of different flow rate and pressure ratio combinations where a change in the flow rate and/or a change in the pressure ratio do cause a significant change in the other factor, respectively. The sensitive region is closer to the surge line boundary.

Figure 4:
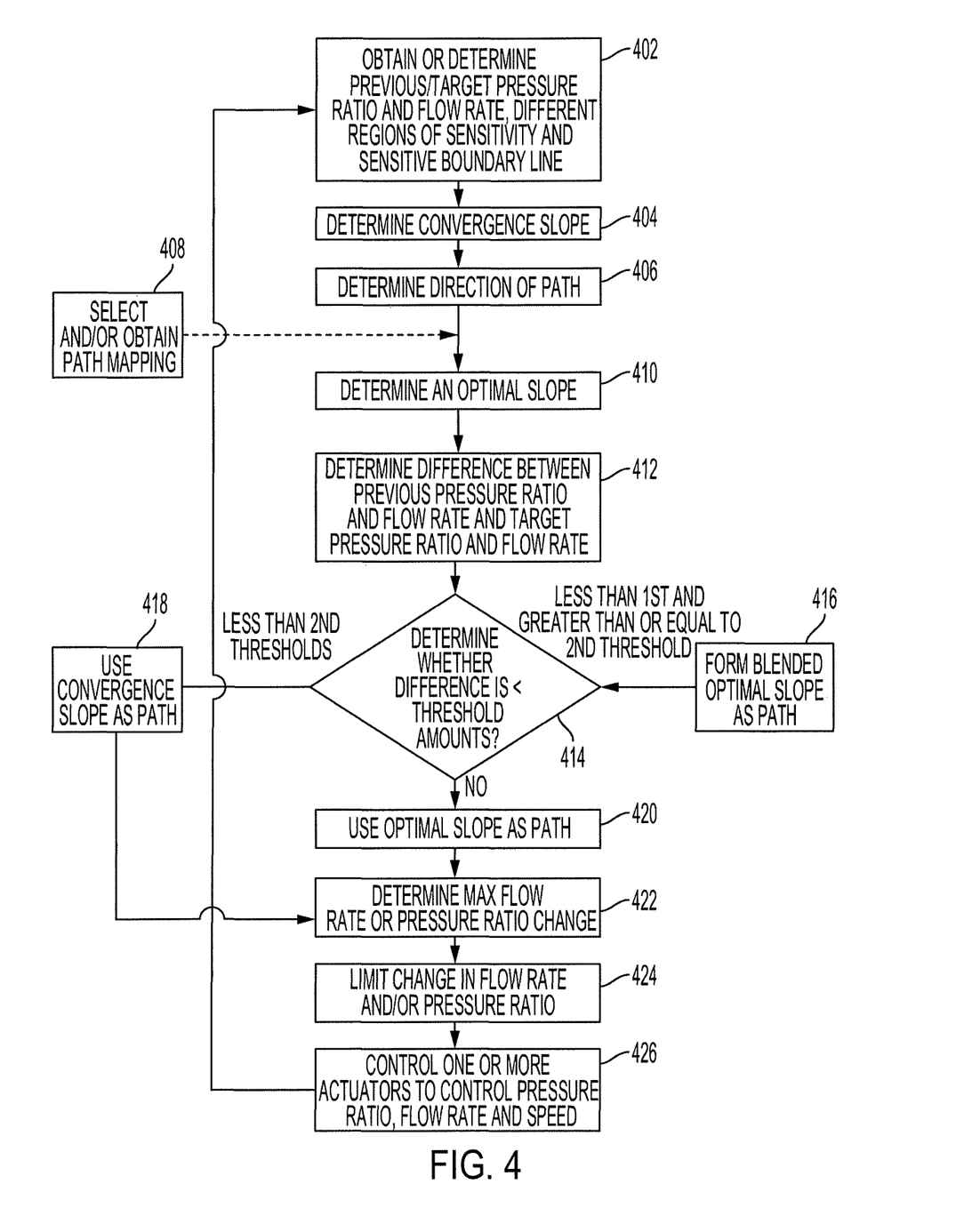
FIG. 4 is a flow diagram of an example process for determining the path control and the rate control of the control system of FIG. 1 according to an aspect of the invention.

The control system 100 determines a path and a rate that transitions the pressure and the flow rate to the target pressure and the target flow rate (310). The control system 100 may determine the path and the rate of the transition from the pressure and the flow rate to the target pressure and the target flow rate based on the pressure and the flow rate, the target pressure and the target flow rate, the different regions of sensitivity the sensitive boundary line and a path mapping. The control system 100 utilizes path control and/or rate control to determine the optimal path and/or the optimal rate to transition the pressure ratio and the flow rate within the compressor 110 and the fuel cell stack 116. Path control identifies the ideal two-dimensional (2-D) space transient path from the flow rate and pressure ratio to the target flow rate and the target pressure ratio. Rate control identifies the ideal allowable step size, i.e., the change in the flow rate and the change in the pressure ratio, for a single time step to meet a transient response time target, while maintaining controllability of the compressor 110 to operate within the normal operation region. Path control ensures the airflow and pressure ratio states remain coupled relative to each other during transients, and rate control ensures these states remain coupled relative to time during transients. FIG. 4 further describes the path control and the rate control to determine the optimal path and the optimal rate. The path control, the rate control, and sensitivity i.e. ACP sensitivity, are key elements of the control of the transition of the pressure and flow rates and may be maps calibration constants, dynamic calculations or other means used to control and/or dictate the manner in which the control system 100 transitions the pressure and flow rates. By determining the optimal path and the optimal rate to transition between different states, the control system 100 increases the response time of the compressor 110 to go from no flow to full flow. This allows the compressor 110 to exceed current response times and meet performance targets and necessary operating conditions.

Once the path and the rate are determined, the control system 100 controls, moves, positions or otherwise adjusts the one or more actuators 108 to control the flow rate, the speed of the compressor 110 and/or the pressure ratio based on the path and the rate (312). At each time step, new "intermediate" target pressure ratio and flow are calculated based on the desired path and rate. The controller then works to move the system to each of these "intermediate states," eventually arriving at the final desired state combination of airflow and pressure ratio. The control system 100 controls the one or more actuators 108 to adjust, manage or otherwise control the flow rate, the speed of the compressor 110 and/or the pressure ratio.

For example, the control system 100 may increase or decrease the speed of the compressor 110. The amount of increase or decrease may be based on the amount of change in the flow rate necessary. By increasing the speed of the compressor 110, the control system 100 increases the flow rate and the amount of air that enters and is split between the fuel cell stack 116 and/or the bypass path 206. By decreasing the speed of the compressor 110, the control system 100 decreases the flow rate and the amount of air that enters and is split between the fuel cell stack 116 and/or the bypass path 206.

In another example, the control system 100 may move, adjust, position or otherwise control the position of the bypass valve 112 that splits the air flow between the fuel cell stack 116 and the bypass path 206. The bypass valve 112 has an adjustable valve position that may be opened, closed or partially opened. The control system 100 may adjust the valve position based on the amount of change in the flow rate necessary. Opening the bypass can reduce the overall backpressure and actually results in a net increase in compressor flow for the same compressor speed. To reach some flow split target, bypass valve, backpressure valve, and speed manipulation are usually necessary together. By opening or further opening the bypass valve 112, the flow rate and/or the amount of air that flows into the bypass path 206 increases and the flow rate and/or amount of air that flows into the fuel cell stack 116 decreases. By closing or further closing the bypass valve 112, the flow rate and/or the amount of air that flows into the bypass path 206 decreases and the flow rate and/or the amount of air that flows into the fuel cell stack 116 increases. This allows the compressor 110 to operate at a higher speed when the bypass valve 112 opens.

In another example, the control system 100 may move, adjust, position or otherwise control the position of the back pressure valve 114. The back pressure valve 114 creates pressure back to the compressor 110 and/or adjusts a pressure of the air within the fuel cell stack 116. The back pressure valve 114 has an adjustable valve position that may be opened, closed or partially opened. The control system 100 may adjust the valve position based on the amount of change in the pressure ratio that is necessary. When the control system 100 opens or further opens the back pressure valve 114, the pressure ratio within the fuel cell stack 116 and/or back to the compressor 110 decreases, and when the control system 100 closes or further closes the back pressure valve 114, the pressure ratio within the fuel cell stack 116 and/or back to the compressor 110 increases.

FIG. 4 is a flow diagram of a process 400 for determining the path and rate that transitions the pressure and the flow rate to the target pressure and the target flow rate. The control system 100 uses the previous flow rate, the previous pressure ratio, the target pressure ratio, the target flow rate and the path mapping of the different regions, such as the non-sensitive and sensitive regions to adjust the speed of the compressor 110 and the pressure ratio and/or the flow rate within the fuel cell stack 116 and the compressor 110. The control system 100 uses one or more actuators 108 to control these parameters. One or more computers or one or more data processing apparatuses, for example, the one or more processors, such as the ECU 104, may implement the process 400.

The control system 100 obtains or determines the previous pressure ratio, $PR_{n-1}$, the previous flow rate, $ACP_{AFR\_n-1}$, the target pressure ratio, $PR_{tgt}$, the target flow rate, $ACP_{AFR\_tgt}$, the different regions of sensitivities and the sensitive boundary line, as described above (402). The previous pressure ratio and/or the previous flow rate refer to the pressure ratio and/or the flow rate of the previous time step value. In the first time step, the previous values may be a current value or measurement. In order to determine the 2-D path control, the control system 100 determines a convergence slope between the previous pressure ratio and the previous flow rate pair and the target flow rate and the target pressure ratio pair (404). The convergence slope is the slope of the most direct linear path, without optimization, from the previous pressure ratio and flow rate pair to the target pressure ratio and flow rate pair. The slope represents the amount that the pressure ratio changes per unit of flow rate, and is the change in the pressure ratio over the change in the flow rate. That is, $$\frac{PR_{tgt} - PR_{n-1}}{ACP_{AFR\_tgt} - ACP_{AFR\_n-1}}.$$

The control system 100 determines a direction for the path in the direction of an intermediate pressure ratio and an intermediate flow rate (406). The intermediate pressure ratio and the intermediate flow rate pair is a point along the sensitive boundary line, where an optimal slope intersects.

The control system 100 uses the direction to determine the intermediate pressure ratio and the intermediate flow rate for the point along the sensitive boundary line in which the previous pressure ratio and the previous flow rate are adjusted towards. The control system 100 determines a relative direction for the path based on the previous pressure ratio and the previous flow rate pair and the target pressure ratio and the target flow rate pair. The control system 100 determines the relative direction that is directed towards the target pressure ratio and the target flow rate pair, while transitioning toward the sensitive boundary line and out of the sensitive region, such as in the direction of the intermediate pressure ratio and the intermediate flow rate, to reduce sensitivity.

Figure 7:
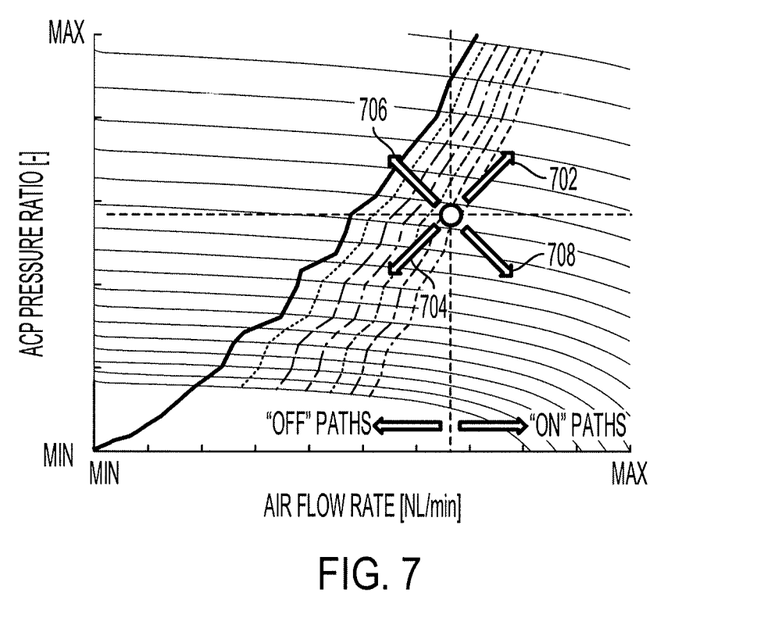
FIG. 7 is an example graph used for solving for rate control (e.g., step size) based on sensitivity using the control system of FIG. 1 according to an aspect of the invention.

For example, if the pressure ratio and the flow rate need to both increase, the direction may be a first direction 702, as shown in FIG. 7. In another example, if the pressure ratio and the flow rate need to both decrease, the direction may be a second direction 704. In other examples, if the pressure ratio needs to increase, and the flow rate needs to decrease, the direction may be a third direction 706, and if the pressure ratio needs to decrease, and the flow rate needs to increase, the direction may be a fourth direction 708. This also allows the control system 100 to make larger pressure ratio and flow rate changes during a time step, when moving in a direction away from the surge boundary, and minimize the overall response time.

Figure 6:
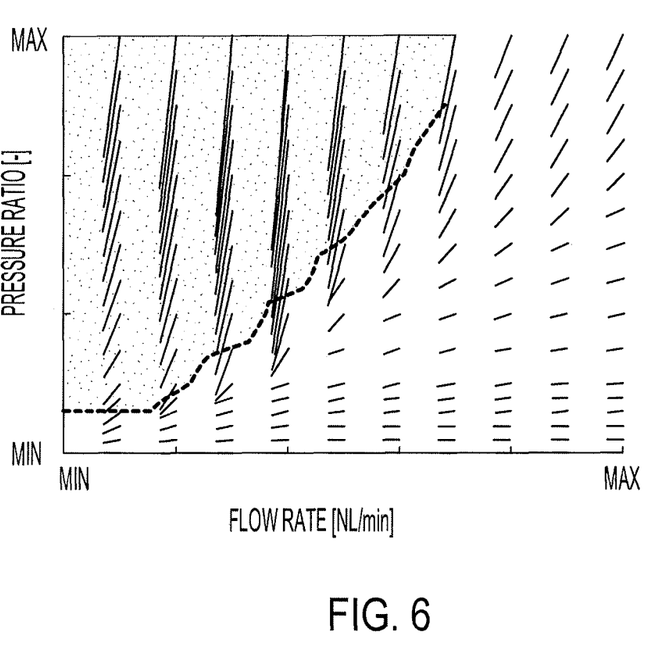
FIG. 6 is an example graph of a path mapping or flow field for the control system of FIG. 1 according to an aspect of the invention.

The control system 100 selects, determines or obtains a path mapping, as shown in FIG. 6 for example, based on the direction (408). The memory 106 may contain multiple path mappings and select the path mappings based on the direction that the path needs to travel. Each direction may correspond to a different path mapping. The path mapping may be stored in the memory 106 or otherwise calculated in real-time. The path mapping shows a direction of travel from the previous flow rate and previous pressure ratio to the sensitive boundary line, while approaching the target flow rate and the target pressure ratio. The path mapping factors in the sensitivity of various pressure ratio and flow rate pairs when traveling in a direction. The path mapping may factor in other factors, such as the efficiency of the operation of the compressor 110 and/or the fuel cell stack 116, the safety of the path for the operation of the compressor 110 and/or the fuel cell stack 116, and/or other tolerance factors for the one or more actuators 108. The control system 100 uses the path mapping to determine the 2-D path control of the pressure ratio and the flow rate.

The control system 100 determines an optimal slope (410). The optimal slope may be based on the path mapping and/or other additional factors. The optimal slope is the slope of the most direct path that minimizes the overall response time and optimizes the transition of the previous pressure ratio and flow rate pair to another pressure ratio and flow rate pair, such as the intermediate pressure ratio and the intermediate flow rate pair. The optimal slope follows the direction for the path to the intermediate pressure ratio and the intermediate flow rate. The optimal slope represents the amount that the pressure ratio changes per unit of flow rate, and is the change in the pressure ratio over the change in the flow rate between the previous pressure ratio, the previous flow rate and the intermediate pressure ratio and the intermediate flow rate. That is, $$\frac{PR_{int} - PR_{n-1}}{ACP_{AFR\_int} - ACP_{AFR\_n-1}} \text{ or } MAP(ACP_{AFR\_n-1}, PR_{n-1}).$$

This slope is an optimized calculation of an allowed change in target flowrate for a given target change in pressure ratio, or vice versa, to ensure the system responds as desired.

The control system 100 determines a difference between the previous pressure ratio and the target pressure ratio and a difference between the previous flow rate and the target flow rate (412). The control system 100 calculates the difference to determine whether to use the convergence slope, the optimal slope or a combination of both to calculate the intermediate pressure ratio and the intermediate flow rate to transition toward in the next time step.

The control system 100 determines whether the difference between the previous pressure ratio and the target pressure ratio or the previous flow rate and the target flow rate is less than a first and/or a second threshold amount (414). If the difference between the previous pressure ratio and the target pressure ratio is less than a first threshold pressure ratio or the difference between the previous flow rate and the target flow rate is less than a first threshold flow rate, but greater than or equal to a second threshold pressure ratio or a second threshold flow rate, respectively, the control system 100 may blend the optimal slope and the convergence slope and form a blended optimal slope to be used as the path (416). The first threshold pressure ratio or the first threshold flow rate may be the pressure ratio or flow rate that is approximately 5 time steps away from the target pressure ratio or the target flow rate, respectively. The second threshold pressure ratio or the second threshold flow rate may be the pressure ratio or flow rate that is approximately 2 time steps away from the target pressure ratio or the target flow rate, respectively. When the control system 100 blends the optimal slope and the convergence slope, the control system 100 may determine the blended optimal slope as follows: $Slope_{tgt} = Slope_{convergence} \times Ratio_{convergence} + Slope_{optimized} \times Ratio_{optimized}$, where the $Ratio_{optimized}$=time steps from target/time steps of the threshold from target and $Ratio_{convergence} = 1 - Ratio_{optimized}$. The control system 100 may use the blended optimal slope as the path.

If the difference between the previous pressure ratio and the target pressure ratio or the difference between the previous flow rate and the target flow rate is less than or equal to a second threshold pressure ratio or a second threshold flow rate, respectively, the control system 100 uses the convergence slope as the path for the remaining time steps until the pressure ratio and the flow rate are equal to the target pressure ratio and the target flow rate (418). For example, the control system 100 may require use of the convergence slope as the path for the last 2 time steps. Otherwise, if the difference between the previous pressure ratio and the target pressure ratio is greater than the threshold pressure ratio or the difference between the previous flow rate and the target flow rate, the control system 100 continues to use the optimal slope as the path in the next time step (420).

Figure 8:
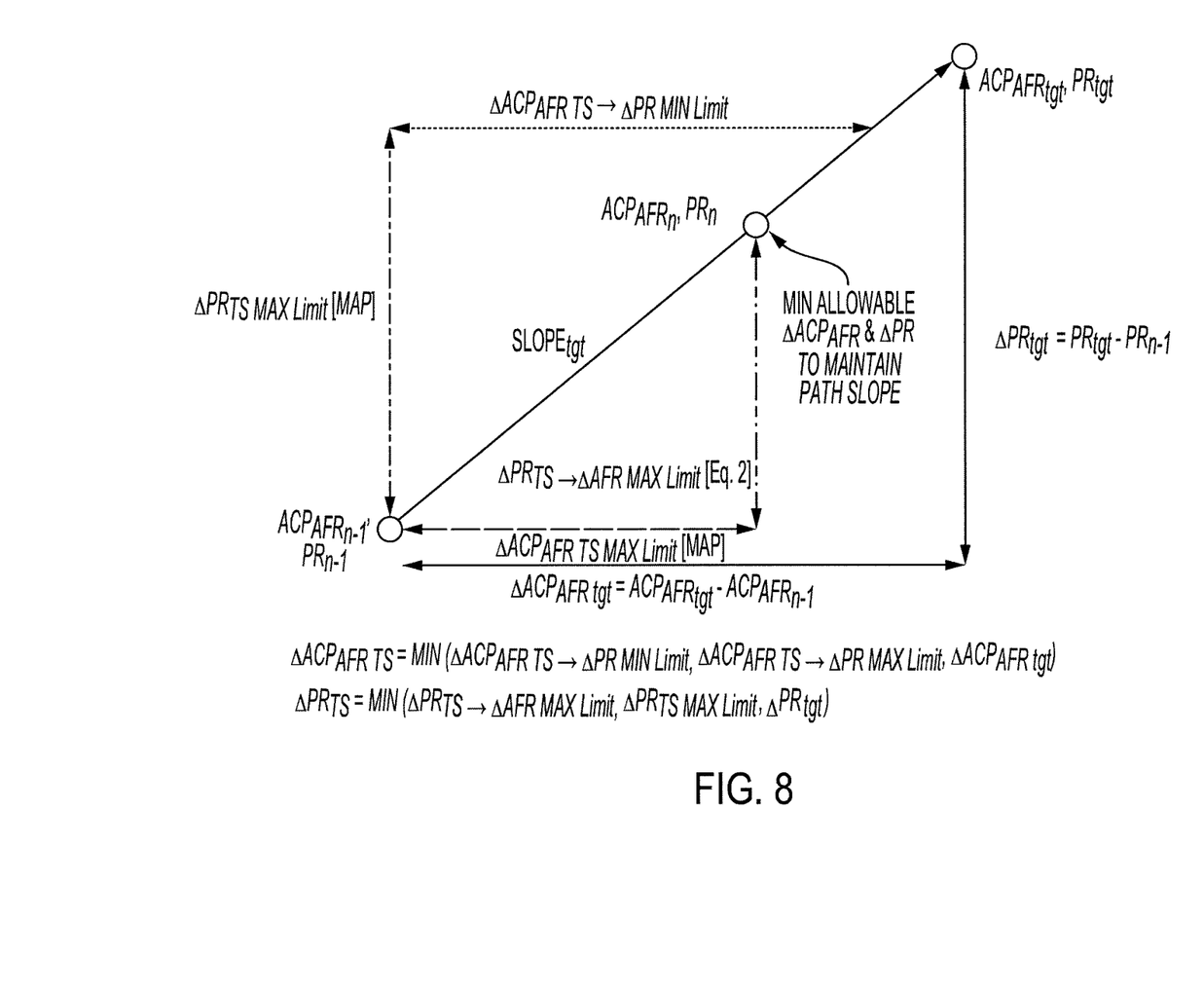
FIG. 8 shows an example calculation of the allowable step size for rate control using the control system of FIG. 1 according to an aspect of the invention.

Once the path control is determined, the control system 100 determines the rate control of the pressure ratio and the flow rate, i.e., the rate of change of the pressure ratio and the flow rate. The allowable step size for rate control of the flow rate and the pressure ratio is defined as a function of the sensitivity and the direction of the transition. FIG. 7 shows a graph which may be used for solving for the rate control (e.g., allowable step size) based on sensitivity. As the pressure ratio and the flow rate transition in the directions 702, 708, the allowable step size increases. Whereas, when the pressure ratio and the flow rate transition in the directions 704, 706, the allowable step size decreases. FIG. 8 shows the calculation of the rate control, e.g., the allowable step size, using the control system 100 of FIG. 1, and which is described below.

To determine the rate control, the control system 100 determines a maximum flow rate and a maximum pressure ratio given an ideal response time from no flow to full flow based on a response time mapping (422). The ideal response time may map to a corresponding maximum flow rate and/or a maximum pressure ratio using the response time mapping. However, due to the sensitivity of changing the pressure ratio and/or the flow rate, the control system 100 limits the rate based on the path (424). The rate refers to the rate for a time step or the change in pressure ratio and flow rate for a time step. For example, the rate control may be based on the sensitivity of the location of the pressure ratio and flow rate pair along the path. When the path of the pressure ratio and flow rate pair are in a less sensitive region, the control system 100 may apply a greater rate of change to the pressure ratio and the flow rate pair. When the path of the pressure ratio and flow rate pair is in a more sensitive region, the control system 100 may apply a lesser rate of change to the pressure ratio and the flow rate pair.

The control system 100 determines a first step size for the maximum change of pressure ratio that may be made along the path based on the sensitivity and a second step size for the maximum change of flow rate that may be made along the path based on the sensitivity. The maximum change of pressure ratio is associated with a corresponding change in flow rate, and the maximum change of flow rate is associated with a corresponding change in pressure ratio. The control system 100 selects the lesser allowable step size of either the first step size associated with the maximum change of pressure ratio and corresponding change in flow rate or the second step size associated with the maximum change of flow rate and corresponding change in pressure ratio as the rate. This calculation first specifies a relationship between the states using the path control. Then one state is specified using the rate control (vs. time), thus fixing the states relative to time and relative to each other.

The control system 100 controls or adjusts the one or more actuators 108, as discussed above, based on the rate and the path, as described above (426). The control system 100 advances the pressure ratio and the flow rate a single time step at the rate along the path, and then, recalculates the path control and the rate control for the next time step until the pressure ratio and the flow rate pair reaches the target pressure ratio and the target flow rate pair. The control or adjustment of the one or more actuators 108 may be further limited or mediated by other factors, such as other restraints or tolerances. For example, the flow rate from the compressor 110 has to be greater than or equal to the flow rate into the fuel cell stack 116.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A control system for controlling air flow within a vehicle, comprising:
    a fuel cell stack configured to generate electrical energy;
    a compressor configured to operate at a speed and provide a total air flow within the vehicle, the compressor having an air pressure ratio and an air flow rate; and
    an electronic control unit coupled to the fuel cell stack and the compressor, and programmed to:

determine a path associated with one or more adjustments that transition the air pressure ratio to a target air pressure ratio and the air flow rate to a target air flow rate,
determine a rate associated with the one or more adjustments based on the path, and
control at least one of the air pressure ratio, the speed or the air flow rate based on the path and the rate.

2. The control system of claim 1, further comprising:
a bypass path that directs air flow toward an exhaust and away from the fuel cell stack; and
a bypass valve that is configured to split the total air flow into a first portion and a second portion, wherein the first portion of the total air flow is directed into the fuel cell stack and the second portion of the total air flow is directed toward the bypass path.

3. The control system of claim 2, wherein the compressor provides the air flow that is sent to the fuel cell stack or the bypass path via the bypass valve.

4. The control system of claim 2, further comprising:
a back pressure valve that is configured to create pressure back to the compressor, wherein to control the at least one of the air pressure ratio, the speed or the air flow rate the electronic control unit is programmed to:
control one or more positions of the back pressure valve or the bypass valve or the speed of the compressor to adjust the air flow rate.

5. The control system of claim 1, wherein the electronic control unit is programmed to:
calculate a sensitivity between the pressure ratio and the air flow rate, wherein the sensitivity indicates a change in the pressure ratio relative to a change in the air flow rate when the speed is constant; and
determine the path and the rate further based on the sensitivity.

6. The control system of claim 5, wherein the electronic control unit is programmed to:
optimize the path and the rate to minimize a response time; and
control the at least one of the air pressure ratio, the speed or the air flow rate further based on the optimized path and the optimized rate.

7. The control system of claim 6, further comprising:
a back pressure valve that is configured to create pressure back to the compressor; and
a bypass valve that is configured to split the total air flow;
wherein to control the at least one of the air pressure ratio, the speed or the air flow rate the electronic control unit is programmed to:
adjust a position of the back pressure valve or the bypass valve, or
adjust the speed of the compressor.

8. A method for controlling air flow within a vehicle, comprising:
determining, by a processor and using one or more sensors, an air flow rate, a pressure ratio and a sensitivity that indicates an amount of change in the air flow rate that occurs relative to an amount of change in the pressure ratio;
determining by the processor, a sensitive region, a non-sensitive region and a sensitive boundary line that represents a boundary of the sensitive region and the non-sensitive region based on the sensitivity;
determining, by the processor, a target air flow rate and a target pressure ratio;

determining, by the processor, a path to transition the air flow rate to the target air flow rate and the pressure ratio to the target pressure ratio;
determining, by the processor, a rate based on the path and the sensitivity; and
controlling, by the processor, one or more actuators to adjust the air flow rate and the pressure ratio based on the rate and the path.

9. The method of claim 8, wherein determining the path to transition the air flow rate to the target air flow rate and the pressure ratio to the target pressure ratio includes:
determining a sensitive region, a non-sensitive region, and a sensitive boundary line between the sensitive region and the non-sensitive region based on a path mapping; and
determining an optimal slope based on the air flow rate, the pressure ratio and the sensitive boundary line.

10. The method of claim 9, wherein determining the optimal slope includes:
determining an intermediary target point on the sensitive boundary line that corresponds to an intermediary pressure ratio and an intermediary pressure air flow rate; and
determining the optimal slope based on the air flow rate, the pressure ratio and the intermediary pressure ratio and the intermediary pressure air flow rate.

11. The method of claim 10, wherein determining the intermediary target point is based on a path mapping.

12. The method of claim 9, further comprising:
determining a convergence slope based on a point that corresponds to the air flow rate and the pressure ratio and a target point that corresponds to the target air flow rate and the target pressure ratio; and
transitioning the optimal slope to the convergence slope when at least one of the air flow rate is within a threshold amount of the target air flow rate or the pressure ratio is within a threshold amount of the target pressure ratio.

13. The method of claim 9, wherein determining the rate based on the path and the sensitivity includes:
determining a first step size along the optimal slope for a maximum change of pressure ratio and corresponding change of flow rate;
determining a second step size along the optimal slope for a maximum change of flow rate and corresponding change of pressure ratio; and
selecting the first step size as an allowable step size for the rate when the first step size is less than or equal to the second step size and the second step size as the allowable step size for the rate when the second step size is less than the first step size.

14. A control system for controlling air flow within a vehicle, comprising:
a fuel cell stack configured to generate electrical energy;
a compressor configured to operate at a speed and provide a total air flow within the vehicle and having an air pressure ratio and an air flow rate;
a bypass valve that is configured to split the total air flow between a bypass path and the fuel cell stack; and
an electronic control unit coupled to the fuel cell stack and the compressor and programmed to:
determine a path associated with one or more adjustments that transition the air pressure ratio to a target air pressure ratio and the air flow rate to a target air flow rate,
determine a transition rate associated with the one or more adjustments based on the path, and control the compressor or the bypass valve to adjust at least one of the air pressure ratio, the speed or the air flow rate based on the path and the transition rate.

15. The control system of claim 14, wherein the compressor provides the air flow that is sent to the fuel cell stack or the bypass path via the bypass valve.

16. The control system of claim 14, further comprising:
a back pressure valve that is configured to create pressure back to the compressor, wherein to control the at least one of the air pressure ratio, the speed or the air flow rate the electronic control unit is programmed to:
control one or more positions of the back pressure valve or the bypass valve or the speed of the compressor to adjust the air flow rate.

17. The control system of claim 14, wherein the electronic control unit is programmed to:
calculate a sensitivity between the pressure ratio and the air flow rate, wherein the sensitivity indicates a change in the pressure ratio relative to a change in the air flow rate the speed is constant, wherein the electronic control unit is configured to determine the path and the rate is further based on the sensitivity.

18. The control system of claim 14, wherein the electronic control unit is programmed to:
optimize the path and the rate to minimize a response time; and
control the at least one of the compressor or the bypass valve to adjust the at least one of the air pressure ratio, the speed or the air flow rate further based on the optimized path and the optimized rate.

19. The control system of claim 14, wherein the electronic control unit is programmed to adjust a position the bypass valve to an opened, a partially opened or a closed position based on the rate and the path.

20. The control system of claim 19, further comprising:
a back pressure valve; and
wherein the electronic control unit is programmed to control the back pressure valve including adjusting a position of the back pressure valve based on the rate and the path.

* * * * *